United States Patent
Nicholas et al.

(10) Patent No.: US 12,424,832 B2
(45) Date of Patent: Sep. 23, 2025

(54) AIRCRAFT CABLE TRAY WITH PISTON

(71) Applicant: LATELEC, Toulouse (FR)

(72) Inventors: Jay Nicholas, Llantrissant (GB); Streeghosh Vinayan Sudha, Kerala (IN)

(73) Assignee: LATELEC, Toulouse (FR)

( * ) Notice: Subject to any disclaimer, the term of this patent is extended or adjusted under 35 U.S.C. 154(b) by 197 days.

(21) Appl. No.: 18/549,036

(22) PCT Filed: Mar. 3, 2022

(86) PCT No.: PCT/EP2022/055458
§ 371 (c)(1),
(2) Date: Sep. 5, 2023

(87) PCT Pub. No.: WO2022/189262
PCT Pub. Date: Sep. 15, 2022

(65) Prior Publication Data
US 2024/0170935 A1    May 23, 2024

(30) Foreign Application Priority Data
Mar. 9, 2021 (FR) .................. FR2102241

(51) Int. Cl.
*H02G 3/04* (2006.01)
*H02G 3/32* (2006.01)

(52) U.S. Cl.
CPC ............. *H02G 3/0437* (2013.01); *H02G 3/32* (2013.01)

(58) Field of Classification Search
None
See application file for complete search history.

(56) References Cited

U.S. PATENT DOCUMENTS

| | | | | |
|---|---|---|---|---|
| 2,938,692 A | * | 5/1960 | Bosworth | H02G 3/32 248/68.1 |
| 8,502,071 B2 | * | 8/2013 | Caveney | H02G 3/22 174/72 A |
| 8,756,772 B2 | * | 6/2014 | Padmore | H02G 3/0418 24/522 |
| 2003/0159846 A1 | * | 8/2003 | Takahashi | H02G 3/0608 174/68.3 |

(Continued)

FOREIGN PATENT DOCUMENTS

| | | |
|---|---|---|
| FR | 2925781 | 6/2009 |
| JP | 2014093817 | 5/2014 |
| WO | WO2011027002 | 3/2011 |

*Primary Examiner* — Krystal Robinson
(74) *Attorney, Agent, or Firm* — Defillo & Associates, Inc.; Evelyn A. Defillo

(57) ABSTRACT

Aircraft cable tray including: a profile section delimiting at least one cable guiding channel; a lateral lip having: a fixing through-orifice; an upper bearing surface which surrounds the fixing through-orifice; a lower bearing surface which surrounds the fixing through-orifice; a cable retention device (4) having: a base (7) equipped with a leg (8) inserted into the fixing through-orifice and including stop surfaces (18, 20) positioned against the lower bearing surface and against the upper bearing surface; a piston (12) having a rod (10) immobilized relative to the base (7), this rod (10) being equipped at one of its ends with a foot (11) positioned in the cable guide channel.

13 Claims, 7 Drawing Sheets

(56) References Cited

U.S. PATENT DOCUMENTS

| | | | |
|---|---|---|---|
| 2012/0193120 A1* | 8/2012 | Edmond | H02G 3/0437 174/68.3 |
| 2012/0205134 A1* | 8/2012 | Brasier | H02G 3/0443 174/68.3 |
| 2013/0075153 A1* | 3/2013 | Viviant | H02G 3/0418 174/481 |
| 2014/0224520 A1* | 8/2014 | Klein | B60R 16/0215 138/92 |

* cited by examiner

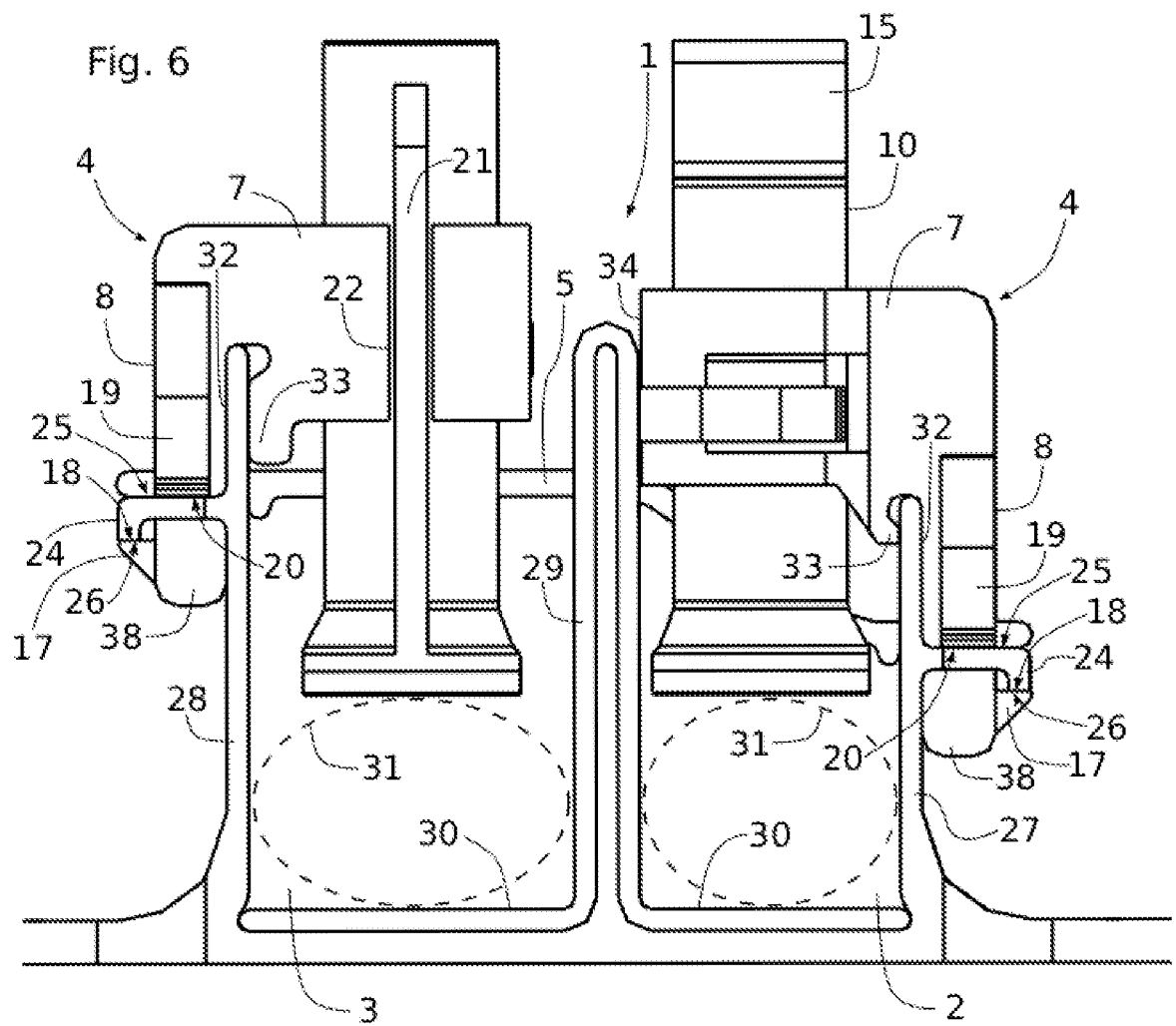

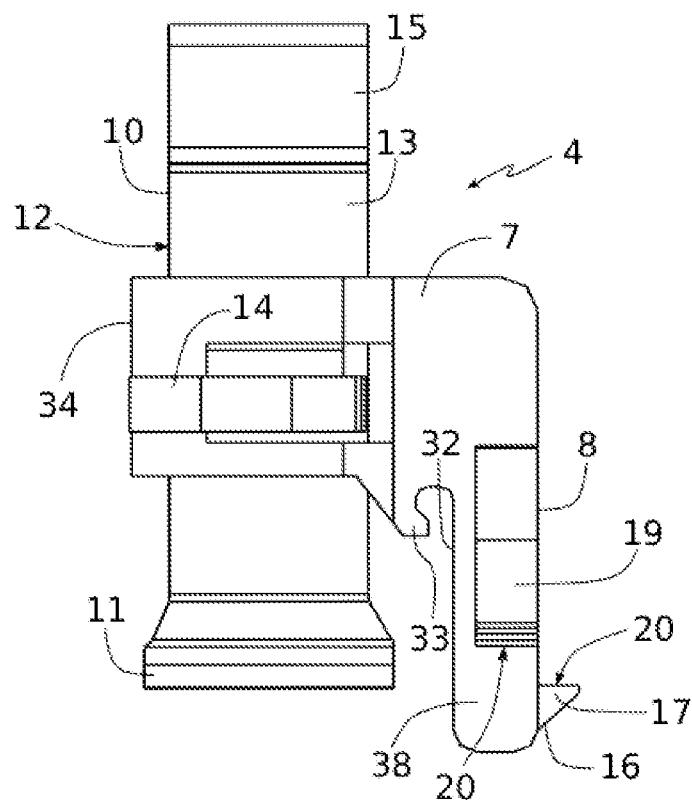

AIRCRAFT CABLE TRAY WITH PISTON

CROSS REFERENCE TO RELATED APPLICATION

This application is a national stage entry of PCT/EP2022/055458 filed Mar. 3, 2022, under the International Convention and claiming priority over French Patent Application No. FR2102241 filed Mar. 9, 2021.

TECHNICAL FIELD

The invention relates to the field of aeronautics and is aimed at how cable trays are arranged in aircraft electrical architectures.

Aircraft cable trays define the routing of the electrical wiring harnesses with respect to the structure of the aircraft, by holding these harnesses in position and protecting them. The electrical wiring harnesses are made up of bundles of cables running between various electrical installations of the aircraft.

PRIOR ART

Aircraft cable trays are generally made up of profile sections extending in the continuation of one another. A predetermined space is left between certain profile sections in order to allow relative movement of the profile sections without damage. The reason for this is that aircraft cable trays may be fixed to structural parts of the aircraft that may be flexible. For example, the cable trays that run along the wings of an aircraft are subjected to bending movements the amplitude of which is relatively great when the aircraft is in flight.

Within each profile section, known cable trays comprise inserts arranged in each cable guide channel. These inserts comprise various elements such as toothed posts arranged on the internal walls of the guide channel and allowing an element to be pressed against the harnesses in order to hold them in place. These inserts are generally costly and fitting them lengthens the aircraft assembly time (numerous inserts are provided for one cable tray and an aircraft comprises numerous cable trays). The bulk of them additionally entails that the cable trays be dimensioned accordingly, with cable guide channels that are wider than is strictly necessary for the bulk of the harness that is to be held in place, thus accordingly leading to additional cost and weight.

Cable trays of this kind are described notably in US 2013/075153A1 and JP 2014/093817A.

SUMMARY OF THE INVENTION

It is an object of the invention to improve the arrangement of cable trays in aircraft of the prior art.

To this end, the invention relates to an aircraft cable tray comprising a profile section which comprises two lateral walls running parallel to a retention lateral plane, each lateral wall having an external face and an internal face, this profile section delimiting at least one cable guiding channel running parallel to the retention lateral plane, this aircraft cable tray comprising:

a lateral lip projecting from the external face of one lateral wall of the profile section, this lateral lip comprising: a fixing through-orifice; an upper bearing surface juxtaposed with the fixing through-orifice; a lower bearing surface juxtaposed with the fixing through-orifice;

a cable retention device comprising: a base equipped with a leg inserted into the fixing through-orifice and comprising stop surfaces positioned against the lower bearing surface and against the upper bearing surface; a piston comprising a rod that can be immobilized with respect to the base, this rod being equipped at one of its ends with a foot positioned in the cable guide channel.

In this document, the presence of a lateral lip includes the possibility of the profile section comprising several lateral lips, as in the example in the detailed description. Likewise, the presence of a fixing through-orifice and of a cable retention device includes the possibility of the cable tray comprising several fixing through-orifices and several cable retention devices, as in the example in the detailed description.

Such an aircraft cable tray comprises no element encumbering the cable guide channel accepting the cable retention device. The electrical wiring harness for a cable guide channel is thus held in place in a way that does not interfere with the contents of the cable tray. The cable tray may thus be dimensioned for best fit. In particular, the width of the elements of the profile section (generally made of metal) forming the cable guide channels can be reduced, leading to a saving on material and on weight.

In each cable guide channel, the electrical wiring harness or harnesses are held only by a drop-down foot acting directly on these harnesses without requiring retention from the inside of the profile section. This foot is held by the cable retention device the only fixing for which is situated on an external face of the profile section.

In addition to permitting savings on mass, material and cost, the invention allows improvements in productivity. The time taken for the aircraft cable tray to be fitted is in fact reduced thanks to rapid fitting of the retaining devices, for example by simply clipping them in.

The invention also affords advantages in terms of the reliability of assembly: the fitting and clamping of the retaining devices is achieved without possibility of error through the calibration of the foot belonging to the base with the fixing through-orifice.

The aircraft cable tray according to the invention may comprise the following additional features, alone or in combination:

the base comprises upper elastic tabs defining upper stop surfaces which are positioned against the upper bearing surface of the lateral lip;
  the upper elastic tabs are elastically deformed in bending by the pressing of the upper stop surfaces on the upper bearing surface of the lateral lip;
  the base comprises lower elastic tabs defining lower stop surfaces which are positioned against the lower bearing surface of the lateral lip;
  the lower elastic tabs comprise a barb allowing the lower elastic tabs to be clip-fastened through the fixing through-orifice;
  the lower elastic tabs are elastically deformed in tension by the pressing of the lower stop surfaces against the lower bearing surface of the lateral lip;
  the rod is immobilized relative to the base by a ratchet mechanism;
  the ratchet mechanism comprises a toothed surface on the rod and an elastic tab on the base, the elastic tab being designed to immobilize the toothed surface of the rod;
  the rod comprises two toothed surfaces on two of its opposite faces, and the base comprises an elastic tab positioned facing each toothed surface;

the base comprises: a lateral bearing surface positioned against the external face of the lateral wall from which the lateral lip projects; a reaction leg positioned facing the lateral bearing surface and positioned against the internal face of the lateral wall from which the lateral lip projects;

the base comprises an additional bearing surface running parallel to the retention lateral plane and positioned against another wall of the profile section;

the leg comprises a prong fitted into the fixing through-orifice;

the cable tray comprises a cover fixed on the lateral lip.

BRIEF DESCRIPTION OF THE DRAWINGS

Further features and advantages of the invention will become apparent from the following nonlimiting description, given with reference to the attached drawings in which:

FIG. 6 is a view in section of the cable tray of FIG. 1;

FIG. 7 is a profile view of the cable retention device of FIGS. 2 and 3;

FIG. 8 is a perspective view of a cable retention device relating to a second embodiment of the invention.

Elements that are similar and common to the various embodiments bear the same reference numerals referring to the figures.

DETAILED DESCRIPTION OF THE INVENTION

Figure 1:
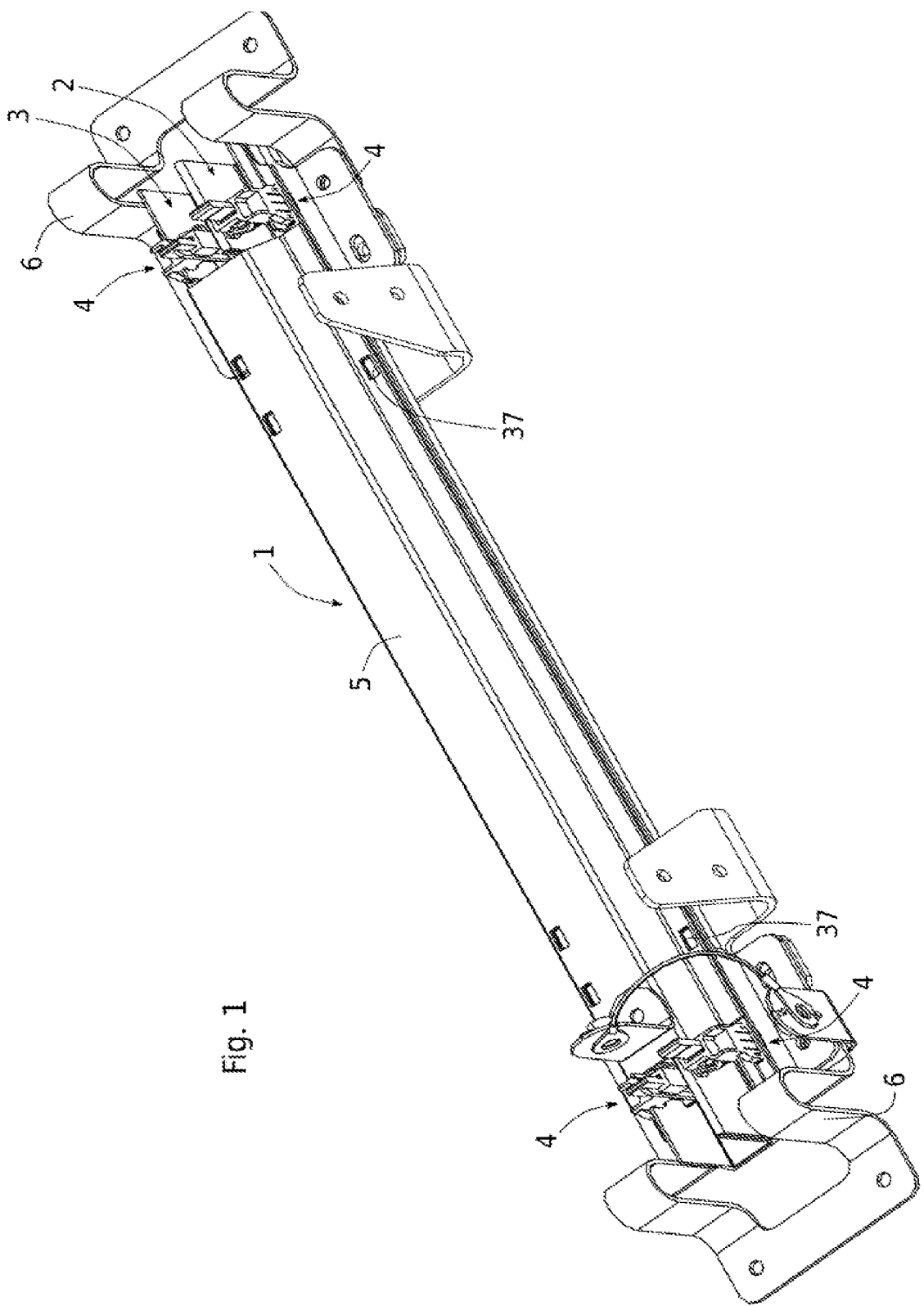
FIG. 1 is a perspective depiction of a cable tray according to the invention.

FIG. 1 illustrates a portion of aircraft cable tray which in this instance is made of a profile section 1. The present example refers to a cable tray referred to as double, the profile section 1 delimiting two parallel cable guide channels 2, 3.

The profile section 1 is produced in a way that is conventional in this field, for example by being metal sheet. The cable guide channels 2, 3 each accept one or more electrical wiring harnesses or other wiring elements. The contents of the channels 2, 3 is held in place by virtue of cable retention devices 4 which in this example are positioned close to each end of the channels 2, 3.

Between the cable retention devices 4 of the one same channel 2, 3, the cable tray is protected by a cover 5 fixed over the profile section 1.

The two ends of the profile section 1 are fitted with elastic fixings 6 allowing each end of the profile section 1 to be coupled with another, identical, profile section in order to form the cable tray customized to the desired length. This complete cable tray is thus mounted on the structure of the aircraft so that the various profile sections 1 have a degree of freedom relative to one another thanks to the elastic fixings 6 so that the cable tray deforms in the same way as the structure of the aircraft, notably during flight.

Figure 2:
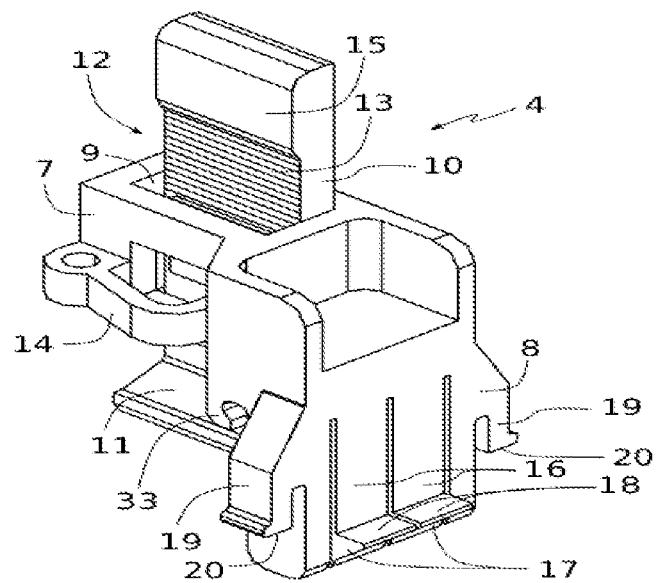
FIG. 2 is perspective depiction of a cable retention device of the cable tray of FIG. 1.
Figure 3:
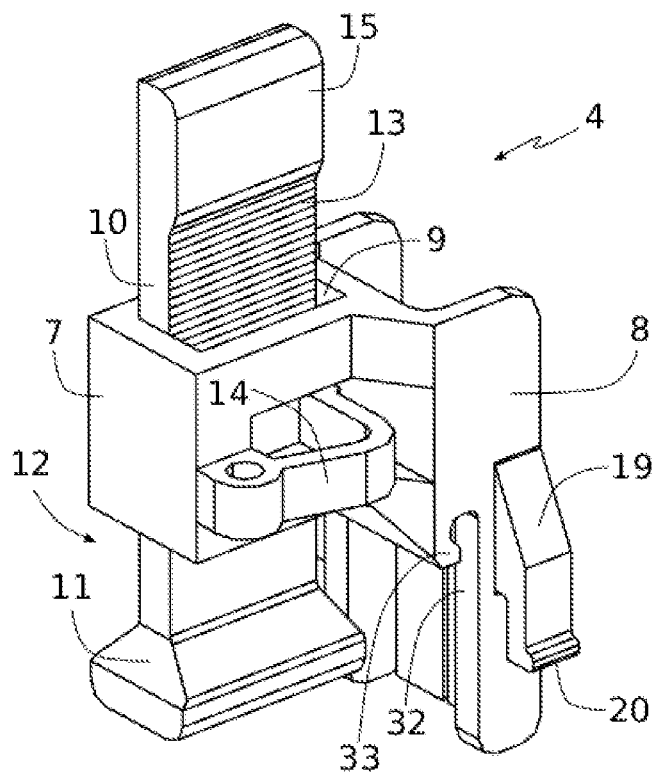
FIG. 3 is another perspective depiction of a cable retention device of the cable tray of FIG. 1.

FIGS. 2 and 3 illustrate in perspective one of the cable retention devices 4 used in the cable tray of FIG. 1. The four cable retention devices 4 are identical here.

Each cable retention device 4 comprises a base 7 which is equipped with a leg 8 for fixing it to the profile section 1.

The base 7 comprises a through-orifice 9 guiding a piston 12. This piston 12 comprises a rod 10 equipped at one of its ends with a foot 11. The piston 12 is thus capable of vertical translational movement in the base 7 (with reference to the orientation of FIGS. 2 and 3).

The rod 10, and therefore the piston 12, can also be immobilized relative to the base 7, which is to say that the device 4 comprises means for stopping the piston 12, these means being able to immobilize the piston in one of its positions between the two (top and bottom) extreme positions. The immobilization of the rod 10 may for example be achieved by means of a toothed surface 13 on the rod 10 calibrating with an elastic tab 14 attached to the base 7. These means may also form a ratchet mechanism having a nonreturn function.

In the present example, the base 7, the leg 8 and the elastic tab 14 are produced as a single piece by molding a dielectric polymer the strength of which is suited to the application enabling the creation of an elastic tab 14 that is sufficiently flexible.

Likewise, the piston 12 here is also produced as a single piece by molding a suitable dielectric polymer. In this case, the rod 10 at one of its ends has a widened portion forming the foot 11 and additionally, at its other end, comprises an end stop 15 which limits the translational movement of the piston 12 in the base 7 and, in normal use, prevents these elements from being separated.

The leg 8 also comprises:

two lower elastic tabs 16 equipped with barbs 17 which define lower stop surfaces 18;

two upper elastic tabs 19 defining upper stop surfaces 20;

two prongs 38 positioned one on each side of the lower elastic tabs 16.

The lower stop surfaces 18 and upper stop surfaces 20 are parallel.

Figure 4:
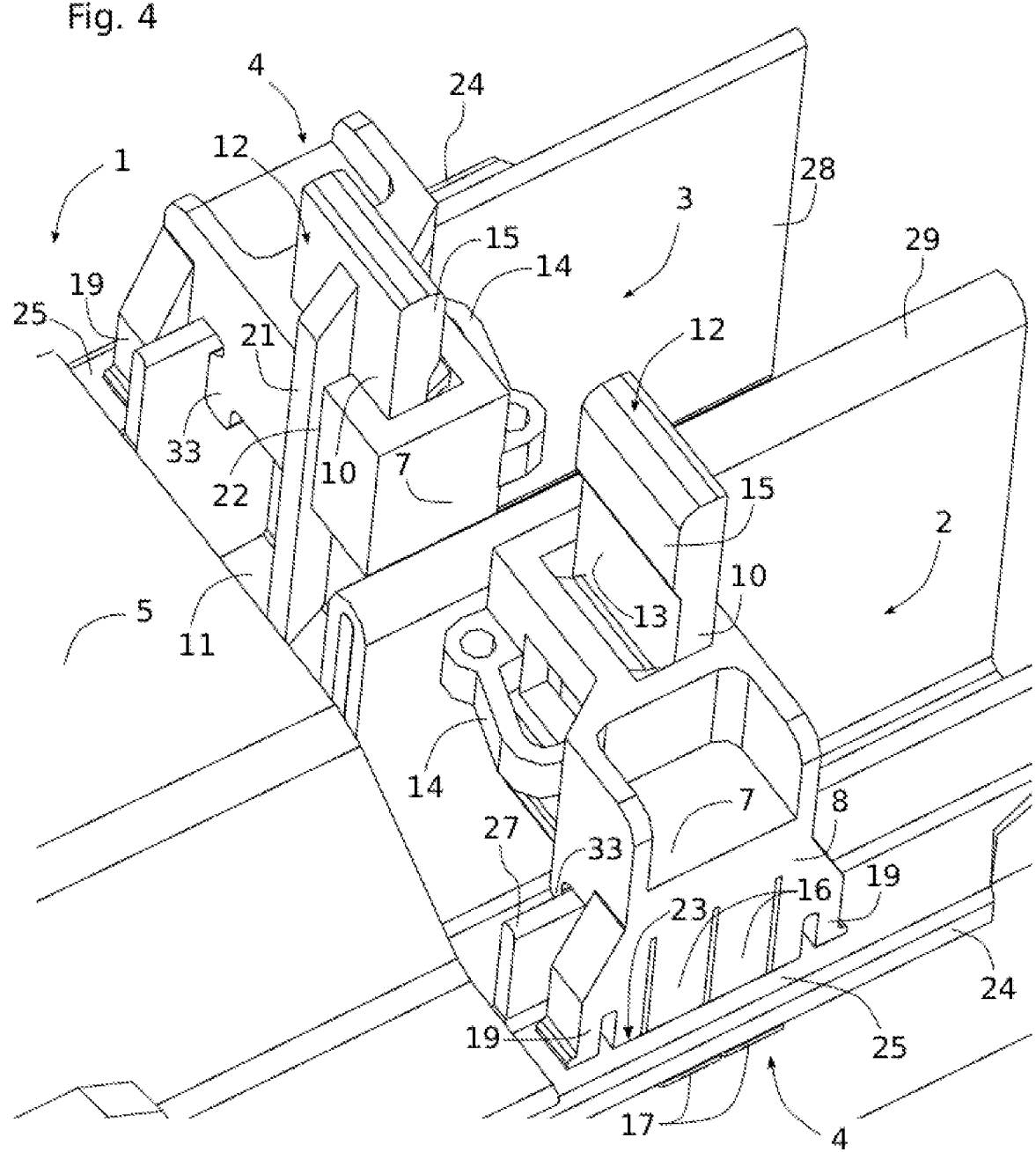
FIG. 4 is a view of a detail of FIG. 1.
Figure 5:
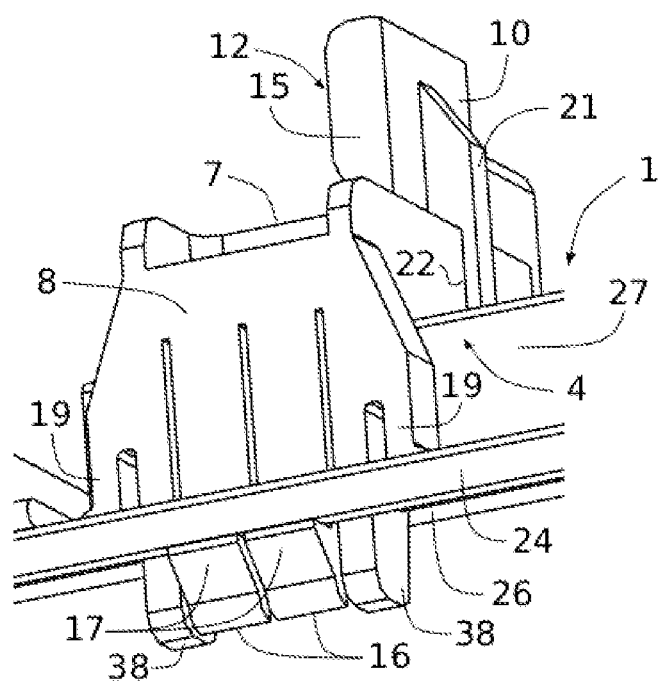
FIG. 5 illustrates a cable retention device mounted on the cable tray.

FIG. 4 is an enlarged view of FIG. 1, showing two cable retention devices 4 side by side, and FIG. 5 is an auxiliary view from a different angle.

The rod 10 comprises, on its opposite face to the toothed surface 13, a guide rib 21 which engages with a slot 22 in the base 7 to guide the translational movement of the piston 12 in the base 7.

The profile section 1 comprises lateral walls 27, 28 which form its lateral edges. In the case of a profile section having one single cable guiding channel, the lateral walls are the only walls of the profile section. In the case of the present example, the profile section 1 defines two channels 2, 3 and its lateral walls 27, 28 therefore each bound one of the channels 2, 3 and the profile section additionally comprises an internal wall 29 which separates the two channels 2, 3.

These lateral walls 27, 28 have an internal face (facing toward the inside of the profile section 1, which is to say toward the channels 2, 3) and an external face (facing toward the outside).

The profile section 1 comprises a lateral lip 24 projecting from the external face of each of the lateral walls 27, 28. For each device 4, the lateral lips 24 comprise a fixing through-orifice 23 which in this example has a rectangular cross section. The lateral lips 24 define an upper bearing surface 25 (situated on the top of the lateral lip 24, with reference to the orientation of the figures) which is juxtaposed with the fixing through-orifice 23, and a lower bearing surface 26

(situated on the underside of the lateral lip 24, with reference to the orientation of the figures) which is also juxtaposed with each fixing through-orifice 23.

The cable retention devices 4 are fixed to the profile section 1 by the inserting of the leg 8 into the fixing through-orifice 23. The prongs 38 are dimensioned to be tailored to the size of the fixing through-orifice 23. These prongs 38 are therefore in contact with the edges of the orifice 23. The lower elastic tabs 16 are themselves dimensioned so that the barbs 17 clip-fasten onto the lateral lip 24, at the edge of the orifice 23. The lower stop surfaces 18 therefore butt against the lower bearing surface 26 of the lateral lip 24. The barbs 17 for this purpose have a profile that allows for clip-fastening (a triangular profile in this example).

FIG. 6 is a view in cross section of the cable tray and illustrates the mounting of the two cable retention devices 4 illustrated in FIG. 4.

Each of the lateral walls 27, 28 runs parallel to a retention lateral plane. This retention lateral plane is defined here as being a plane that is perpendicular to the bottom wall 30 along which the wiring runs, and that extends along the longitudinal axis of the profile section 1, which is to say in the direction in which the wiring runs.

In FIG. 6, the electrical wiring harnesses that are immobilized by the cable retention devices 4 are indicated schematically by the sections shown in broken line 31.

Each lateral lip 24 is formed of a profile section which on the top exhibits the upper bearing surface 25 and which has a bent-over end forming the lower bearing surface 26. FIG. 6 shows the bearing of the upper stop surfaces 20 of the tabs 16 on the upper bearing surface 25, and the bearing of the lower stop surfaces 18 of the barbs 17 on the lower bearing surfaces 26.

The distance separating the lower stop surfaces 18 and the upper stop surfaces 20 is dimensioned to trap the lateral lip 24, given the separation between the bearing surfaces 25, 26. The distance between the stop surfaces 18, 20 is preferably slightly smaller than the distance between the bearing surfaces 25, 26 so that the clip-fastening of the leg 8 into the fixing orifice 23 causes elastic deformation of the tabs 16, 19 for better retention of the base 7 on the lateral lip 24. The upper elastic tabs 19 are thus elastically deformed in bending by the pressing of the upper stop surfaces 20 on the upper bearing surface 25 of the lateral lip 24. The lower elastic tabs 16 are themselves elastically deformed in tension by the pressing of the lower stop surfaces 18 against the lower bearing surface 26 of the lateral lip 24.

This retention by means of the stop surfaces 18, 20 is combined with the retention afforded by the prongs 38 which fit closely in the fixing through-orifice 23. The base 7 additionally comprises:
- a lateral bearing surface 32 which runs perpendicular to the stop surfaces 18, 20 and which is intended to bear against the lateral wall 27, 28;
- a reaction leg 33 which is situated some distance from the lateral bearing surface 32 that corresponds substantially to the thickness of the lateral wall 27, 28.

The lateral wall 27, 28 is thus trapped between the lateral bearing surface 32 and the reaction leg 33.

These elements allow the base 7 to be mounted cantilever fashion over the guide channel 2, 3.

In this example, the two cable guide channels 2, 3 are different: the lateral wall 27 is lower than the lateral wall 28. The devices 4 also exhibit variations: the reaction leg 33 of the device 4 of the channel 3 is larger than the reaction leg 33 of the device 4 of the channel 2. The dimensions of the reaction leg 33 and of the lateral bearing surface 32 are dependent on the force to be envisioned for the application.

This fixing of the cable retention device 4 allows optimal retention of the electrical wiring harnesses 31 by immobilizing the piston 12 against the harness.

Optionally, the retention of the cable retention device 4 may be supplemented by an additional bearing surface 34 provided on the base 7, and by the base 7 being dimensioned such that this additional surface 34 comes to bear against the internal wall 29 (or the opposite lateral wall in the case of a profile section having one single cable guide channel). In FIG. 6, the device 4 for the channel 2 illustrates this option.

The method for fitting the aircraft cable tray when assembling the aircraft is considerably simplified, safer and faster. It simply involves the following steps:
- fixing the various profile sections 1 end to end over the structure of the aircraft and fitting the elastic fixings 6, so as to construct the cable tray;
- laying the electrical wiring harnesses in the cable guide channels 2, 3;
- clipping the cable retention devices 4 into their fixing through-orifices 23, followed by pressing the piston 12 down (manually or in an automated and calibrated manner) so that the foot 11 moves down in the channel 2, 3 until it comes into contact with the harnesses. This lowering of the piston 12 is done with the elastic tab 14 moving over the toothed surface 13 and performing a nonreturn function when the foot 11 is in place.

The wiring is then completed and the cover 5 may be fitted. Advantageously, the lateral lips 24 additionally allow the cover 5 to be fixed in place using clips 37 or any other means of holding the cover 5 against one of the lateral lips 24, or both.

Figure 9:
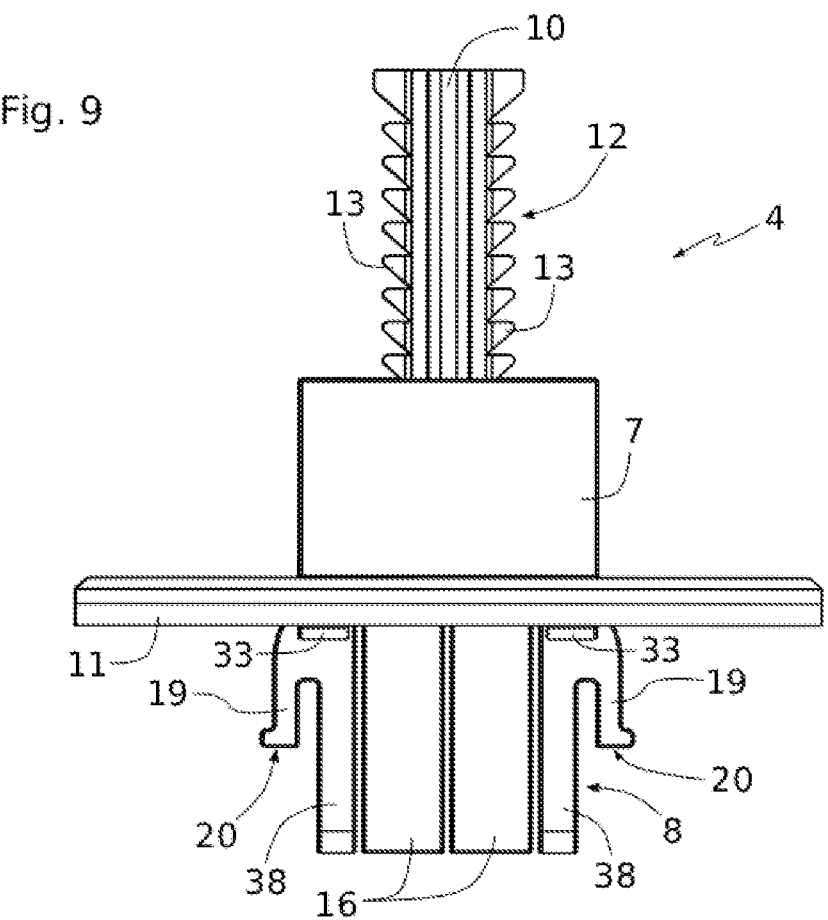
FIG. 9 is a rear view of the cable retention device of FIG. 8.

FIGS. 8 and 9 illustrate a second embodiment of the cable retention device 4.

According to this second embodiment, the rod 10 has a cross section that is greater than in the first embodiment and the shape of which allows translational guidance with the base 7. The rod 10 comprises two slots 35 engaging with two ribs 36 of the base 7. The rod 10 additionally comprises two toothed surfaces 13 on two opposite faces of the rod 10.

The foot 11 is also made of a parallelepiped of a length (which is to say the dimension measured along the longitudinal axis of the profile section 1) that is greater than the dimensions of the base 7.

This cable retention device 4 is suitable for supplying a higher reaction force over a larger area and is notably able to hold in place electrical wiring harnesses of greater cross section or greater mass.

Optionally, the piston 12 may be produced in two parts, with a rod 10 molded from a rigid polymer material and a foot 11 molded from an elastomeric material allowing it to conform to the shape of the electrical wiring harnesses.

The toothed surfaces 13 illustrated here in profile in FIG. 9 have teeth of triangular cross section shaped to offer a nonreturn effect.

The invention claimed is:

1. An aircraft cable tray comprising:
a profile section (1) which comprises two lateral walls (27,28) running parallel to a retention lateral plane, each one of the lateral wall (27,28) having an external face and an internal face, the profile section (1) delimiting at least one cable guiding channel (2,3) running parallel to the retention lateral plane, the aircraft cable tray comprises:
a lateral lip (24) projecting from the external face of one lateral wall (24,28) of the profile section (1), the lateral lip (24) comprising: a fixing through-orifice (23); an upper bearing surface (25) juxtaposed with the fixing through-orifice (23); a lower bearing surface (26) juxtaposed with the fixing through-orifice (23);

a cable retention device (4) comprising: a base (7) equipped with a leg (8) inserted into the fixing through-orifice (23) and comprising stop surfaces (18,20) positioned against the lower bearing surface (26) and against the upper bearing surface (25); a piston (12) comprising a rod (10) immobilized with respect to the base (7), the rod (10) being equipped at one of its ends with a foot (11) positioned in the cable guide channel (2,3).

2. The aircraft cable tray as claimed in claim 1, wherein the base (7) comprises upper elastic tabs (19) defining upper stop surfaces (20) which are positioned against the upper bearing surface (25) of the lateral lip (24).

3. The aircraft cable tray as claimed in claim 2, wherein the upper elastic tabs (19) are elastically deformed in bending by the pressing of the upper stop surfaces (20) on the upper bearing surface (25) of the lateral lip (24).

4. The aircraft cable tray as claimed in claim 1, wherein the base (7) comprises lower elastic tabs (16) defining lower stop surfaces (18) which are positioned against the lower bearing surface (26) of the lateral lip (24).

5. The aircraft cable tray as claimed in claim 4, wherein the lower elastic tabs (16) comprise a barb (17) allowing the lower elastic tabs (16) to be clip-fastened through the fixing through-orifice (23).

6. The aircraft cable tray as claimed in claim 4, wherein the lower elastic tabs (16) are elastically deformed in tension by the pressing of the lower stop surfaces (18) against the lower bearing surface (26) of the lateral lip (24).

7. The aircraft cable tray as claimed in claim 1, wherein the rod (10) is immobilized relative to the base (7) by a ratchet mechanism.

8. The aircraft cable tray as claimed in claim 7, wherein the ratchet mechanism comprises a toothed surface (13) on the rod (10) and an elastic tab (14) on the base (7), the elastic tab (14) being designed to immobilize the toothed surface (13) of the rod (10).

9. The aircraft cable tray as claimed in claim 8, wherein the rod (10) comprises two toothed surfaces (13) on two of its opposite faces, and in that the base (7) comprises an elastic tab (14) positioned facing each toothed surface (13).

10. The aircraft cable tray as claimed in claim 1, wherein the base comprises:

a lateral bearing surface (32) positioned against the external face of the lateral wall (27,28) from which the lateral lip (24) projects;

a reaction leg (33) positioned facing the lateral bearing surface (32) and positioned against the internal face of the lateral wall (27,28) from which the lateral lip (24) projects.

11. The aircraft cable tray as claimed in claim 1, wherein the base comprises an additional bearing surface running parallel to the retention lateral plane and positioned against another wall of the profile section.

12. The aircraft cable tray as claimed in claim 1, wherein the leg (8) comprises a prong (38) fitted into the fixing through-orifice (23).

13. The aircraft cable tray as claimed in claim 1, further comprising a cover (5) fixed on the lateral lip (24).

* * * * *